United States Patent
Shimizu et al.

(10) Patent No.: US 7,580,065 B2
(45) Date of Patent: Aug. 25, 2009

(54) MOVEMENT DECISION METHOD FOR ACQUIRING SUB-PIXEL MOTION IMAGE APPROPRIATE FOR SUPER RESOLUTION PROCESSING AND IMAGING DEVICE USING THE SAME

(75) Inventors: Masao Shimizu, Tokyo (JP); Masatoshi Okutomi, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 598 days.

(21) Appl. No.: 10/572,172

(22) PCT Filed: Apr. 12, 2005

(86) PCT No.: PCT/JP2005/007373

§ 371 (c)(1),
(2), (4) Date: Mar. 15, 2006

(87) PCT Pub. No.: WO2005/104524

PCT Pub. Date: Nov. 3, 2005

(65) Prior Publication Data

US 2007/0035621 A1  Feb. 15, 2007

(30) Foreign Application Priority Data

Apr. 22, 2004  (JP) .............................. 2004-126574

(51) Int. Cl.
*H04N 5/262* (2006.01)
*H04N 5/225* (2006.01)
*H04N 9/04* (2006.01)

(52) U.S. Cl. .................. 348/239; 348/207.99
(58) Field of Classification Search .................. 348/239, 348/135; 382/148
See application file for complete search history.

(56) References Cited

U.S. PATENT DOCUMENTS 7,075,059 B2 * 7/2006 Oldham et al. .............. 250/234

(Continued)

FOREIGN PATENT DOCUMENTS

EP  0 836 318 A2  4/1998

(Continued)

OTHER PUBLICATIONS

English Machine Translation of JP-10-327359-A.*

(Continued)

*Primary Examiner*—Tuan V Ho
*Assistant Examiner*—Jason Flohre
(74) *Attorney, Agent, or Firm*—Ladas & Parry LLP

(57) ABSTRACT

The present invention provides a movement decision method for determining direction and distance of one-dimensional movement of image capturing object or image capturing element for capturing two-dimensional sub-pixel motion image suitable for super-resolution processing, and an image capturing device using this movement decision method.

while image capturing object is moved along a predetermined one-dimensional moving direction, sequential image of image capturing object is captured by fixed image capturing device, sequential image is set to two-dimensional sub-pixel motion image suitable for super-resolution processing, and one-dimensional moving direction of image capturing object in a coordinate system normalized by aspect ratio of pixel of image capturing element within image capturing device is determined to p/q of a rational number, wherein: one pixel of vertical direction of coordinate system is divided by an integer p, and one pixel of horizontal direction of coordinate system is divided by an integer q.

9 Claims, 17 Drawing Sheets

U.S. PATENT DOCUMENTS

2002/0012059 A1* 1/2002 Wallerstein et al. .......... 348/335
2002/0126732 A1 9/2002 Shaokouri et al.

FOREIGN PATENT DOCUMENTS

| EP | 1 075 135 A | 2/2001 |
| EP | 1 320 254 A | 6/2003 |
| GB | 2 394 543 A | 4/2004 |
| JP | 3-173277 | 7/1991 |
| JP | 5-110957 | 4/1993 |
| JP | 05-110957 | 4/1993 |
| JP | 10-117304 | 5/1998 |
| JP | 10-327359 | 12/1998 |
| JP | 10327359 A * | 12/1998 |
| WO | 00/59206 A | 10/2000 |
| WO | 03/047234 A | 6/2003 |
| WO | 2004/063991 A1 | 10/2003 |
| WO | 2004/068862 A1 | 10/2003 |

OTHER PUBLICATIONS

Microfilm of the specification and drawings annexed to the request of Japanese Utility Model Application No. 102499/1988 (Laid-open No. 24680/1990), NEC Corp., Feb. 19, 1990 with English-language abstract (12 pages).

Tekalp, A., et al., "High-Resolution Image Reconstructions from Lower-Resolution Image Sequeences and Space-Varying Image Restoration," *IEEE International Conference Acoustics, Speech and Signal Processing (ICASSP)*, 1992, pp. 169-172.

\* cited by examiner $$\frac{p}{q} = \frac{1}{40}, \frac{1}{32}, \frac{1}{25}, \frac{1}{20}, \frac{1}{16}$$

FIG.9

$$\text{Delta\_max}(p,q,\text{Lact}) := \begin{vmatrix} \text{for } n \in 0..\text{Lact} - 1 \\ \quad B_n \leftarrow \frac{q}{p} \cdot n - \text{floor}\left(\frac{q}{p} \cdot n\right) \\ C \leftarrow \text{sort}(B) \\ C_{\text{Lact}} \leftarrow 1 \\ \text{for } n \in 0..\text{Lact} - 1 \\ \quad dB_n \leftarrow C_{n+1} - C_n \\ dC \leftarrow \text{sort}(dB) \\ dC_{\text{Lact}-1} \end{vmatrix}$$

$$\text{Delta\_min}(p,q,\text{Lact}) := \begin{vmatrix} \text{for } n \in 0..\text{Lact} - 1 \\ \quad B_n \leftarrow \frac{q}{p} \cdot n - \text{floor}\left(\frac{q}{p} \cdot n\right) \\ C \leftarrow \text{sort}(B) \\ C_{\text{Lact}} \leftarrow 1 \\ \text{for } n \in 0..\text{Lact} - 1 \\ \quad dB_n \leftarrow C_{n+1} - C_n \\ dC \leftarrow \text{sort}(dB) \\ dC_0 \end{vmatrix}$$

FIG.15
Lact=107.3, a=14.2/107.3
(B)
MEASURED SUB-PIXEL MOTION DISTRIBUTION
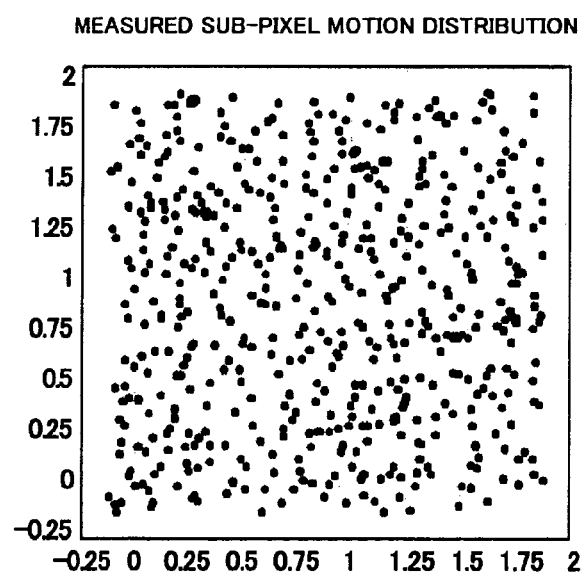
(C)
CALCULATED SUB-PIXEL MOTION DISTRIBUTION
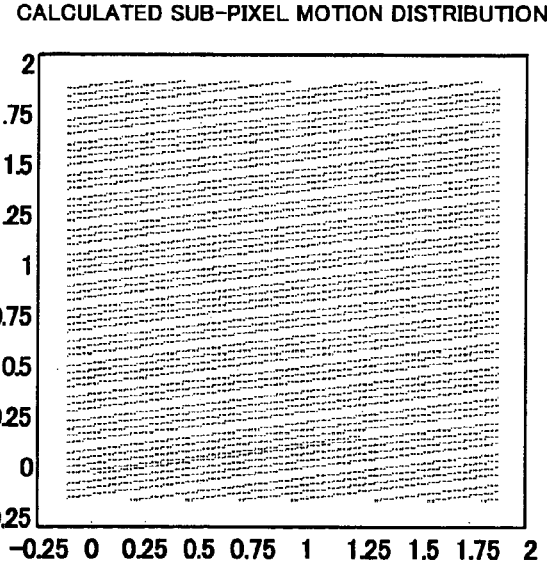
(D)
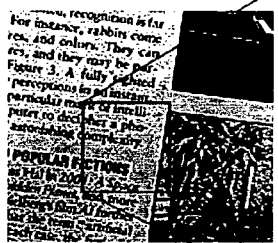
(E)
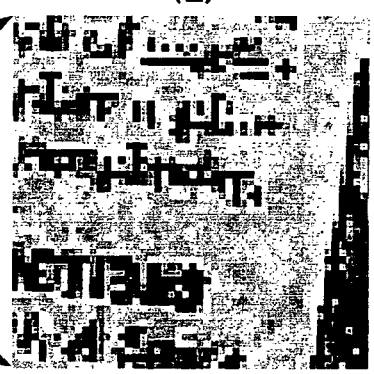
SIMPLE ENLARGEMENT OF
Kodak DEMOSAICING PROCESS
(F)
RESULT OF SUPER-
RESOLUTION PROCESS

MOVEMENT DECISION METHOD FOR ACQUIRING SUB-PIXEL MOTION IMAGE APPROPRIATE FOR SUPER RESOLUTION PROCESSING AND IMAGING DEVICE USING THE SAME

TECHNICAL FIELD

The present invention relates to super-resolution technique for generating one high resolution image from plural low resolution images, and particularly, relates to movement decision method of image capturing object or image capturing element for capturing two-dimensional sub-pixel motion image suitable for super-resolution processing, and image capturing device using this movement decision method.

BACKGROUND TECHNIQUE

It is necessary to capture plural images in which the displacement between images are two-dimensionally distributed sufficiently closely at an equal interval as much as possible so as to perform the super-resolution processing for generating one high resolution image by utilizing plural input images of low resolution. However, it was difficult to capture the plural images having the two-dimensional displacement suitable for such super-resolution processing.

Therefore, there were conventionally many cases adopting the following methods.

(a) The image capturing object is captured while the image capturing element (e.g., CCD image capturing element) within the image capturing device (e.g., digital CCD camera) is two-dimensionally finely moved by a known moving amount.

(b) Sufficient many images are manually captured without fixing the image capturing device (e.g., digital CCD camera) to a tripod, etc., and the image which have displacement suitable for the super-resolution processing is selected from the many captured images.

However, in the conventional method of the above (a), there are disadvantages in that two actuators are required to perform a two-dimensional operation in the image capturing device (e.g., digital CCD camera), and a moving mechanism of the image capturing device (e.g., CCD image capturing element) becomes complicated so that the image capturing device becomes an expensive product.

The conventional method of the above (b) is a method for expecting an accidental displacement by a portable camera, etc. Therefore, problems exist in that there is no guarantee able to capture the displacement image required in the super-resolution processing, and it is not known to capture the image till when. Namely, when the image capturing device (e.g., digital CCD camera) is manually moved, there is a possibility that the degree of motion freedom is increased. Therefore, it is impossible to voluntarily control the displacement amount less than a pixel unit (hereinafter simply called a sub-pixel). Accordingly, there is a difficulty in that no super-resolution image of high quality can be necessarily obtained.

The present invention has been made in view of the circumstances described above. An object of the present invention is to provide a movement decision method for determining direction and distance of one-dimensional movement of image capturing object or image capturing element for capturing two-dimensional sub-pixel motion image suitable for super-resolution processing, and an image capturing device using this movement decision method.

DISCLOSURE OF THE INVENTION

The present invention relates to a movement decision method for capturing sub-pixel motion image suitable for super-resolution processing. The above object of the present invention is effectively achieved by the construction that, while an image capturing object is moved along a predetermined one-dimensional moving direction, a sequential image of said image capturing object is captured by a fixed image capturing device, said sequential image is set to a two-dimensional sub-pixel motion image suitable for super-resolution processing, and said one-dimensional moving direction of said image capturing object in a coordinate system normalized by aspect ratio of pixel of an image capturing element within said image capturing device is determined to p/q of a rational number, wherein: one pixel of vertical direction of said coordinate system is divided by an integer p, and one pixel of horizontal direction of said coordinate system is divided by an integer q.

The above object of the present invention is also effectively achieved by the construction that absolute value of said integer p and absolute value of said integer q are integers which are not small integers. The above object of the present invention is also effectively achieved by the construction that a moving direction for setting value of an evaluation function Cover(Lact) to be smaller than 1 is set to said one-dimensional moving direction of said image capturing object when magnification of said super-resolution processing is fixed and known. The above object of the present invention is also effectively achieved by the construction that a moving direction for setting value of an evaluation function SCover(LM) to be smaller than 1 is set to said one-dimensional moving direction of said image capturing object.

The present invention also relates to an image capturing device using the movement decision method for capturing sub-pixel motion image suitable for super-resolution processing. The above object of the present invention is also effectively achieved by an image capturing device which captures a two-dimensional sub-pixel motion image suitable for super-resolution processing, said image capturing device comprises: a driving mechanism which one-dimensionally drives an image capturing element within said image capturing device along an image capturing element moving direction, wherein: said one-dimensional moving direction of said image capturing object determined by the method according to the present invention is set to said image capturing element moving direction, a sequential image of a fixed image capturing object is captured while said image capturing element is moved by said driving mechanism along said image capturing element moving direction, and said sequential image is set to said two-dimensional sub-pixel motion image.

The above object of the present invention is also effectively achieved by an image capturing device which captures a two-dimensional sub-pixel motion image suitable for super-resolution processing, said image capturing device characterized by arranging a member for optically moving image in a predetermined direction between a lens and an image capturing element, wherein: said one-dimensional moving direction of said image capturing object determined by the method according to the present invention is set to said predetermined direction, a sequential image of a fixed image capturing object is captured, and said sequential image is set to said two-dimensional sub-pixel motion image.

BRIEF DESCRIPTION OF THE DRAWINGS

FIG. 9 shows numerical calculation algorithm for calculating Δmax(Lact) and Δmin(Lact).

FIG. 15 shows experimental result of the super-resolution processing when moving direction is appropriately set.

BEST MODE FOR CARRYING OUT THE INVENTION

Figure 1:
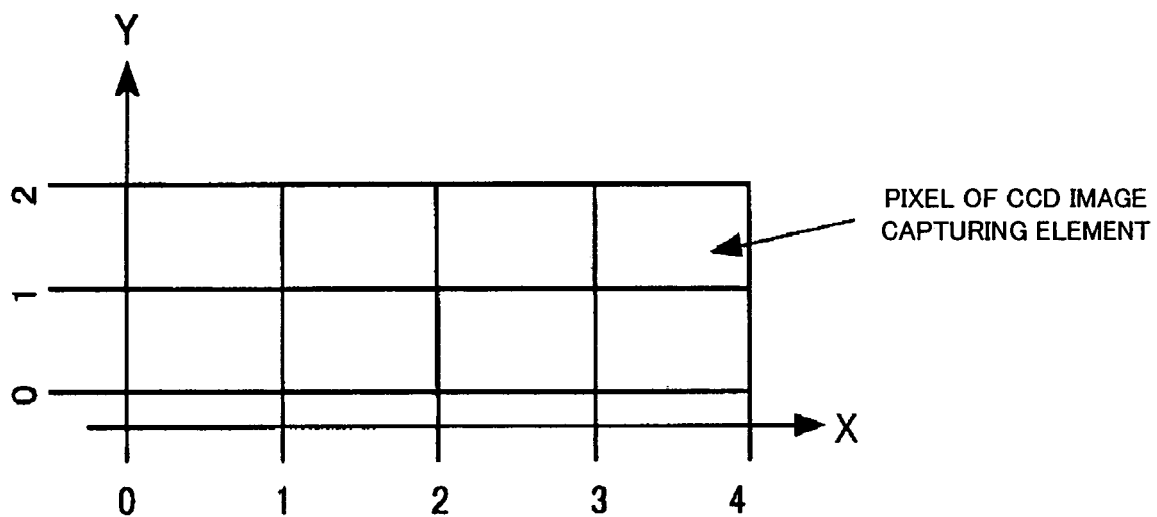
FIG. 1 explains pixel of CCD image capturing element having rectangular shape.

Best modes for carrying out the present invention will next be explained with reference to the drawings.

In the present invention, an aimed point is to construct an optimum two-dimensional sub-pixel motion distribution used in the super-resolution processing from sequential images in which one-dimensional movement of image capturing object is captured by an image capturing device (e.g., a digital camera using a CCD image capturing element and hereinafter also simply called a CCD camera). Namely, in the present invention, two-dimensional sub-pixel motion image suitable for the super-resolution processing is constructed from sequential images in which one-dimensional movement of image capturing object is captured. In this case, the most important characteristic of the present invention is that two-dimensional sub-pixel motion image suitable for the super-resolution processing is obtained by determining direction and distance of one-dimensional movement of image capturing object by using an evaluation function described later.

In short, when track of one-dimensional movement of image capturing object (hereinafter also called a moving track) is mapped to an area of 1×1 [pixel], the most important characteristic of the present invention is that direction and distance of one-dimensional movement of image capturing object are determined by utilizing evaluation function representing that moving track "covers" this entire area of 1×1 [pixel]. Term "pixel" used in the present invention (hereinafter also called picture element) means pixel of image capturing element (e.g., CCD image capturing element) within image capturing device.

Here, the following conditions are set as preconditions.

(1) Moving track of image capturing object is started from origin (0,0) of coordinate system on an image.

(2) With respect to direction of one-dimensional movement of image capturing object θ (hereinafter also simply called moving direction θ or moving angle θ), $0°<θ<45°$ is considered. Namely, $0<a<1$ is formed with respect to gradient of straight line representing moving direction a (hereinafter also called gradient of moving direction a). With the exception of $0°<θ<45°$, moving direction having other angle θ becomes equal to above $0°<θ<45°$ by performing appropriate coordinate transformation such as replacement of horizontal direction variable and vertical direction variable, etc.

For brevity of explanation, there is also a case in which gradient of moving direction is simply called moving direction in the present invention. For example, when gradient a of moving direction θ is ¼, it can be also said that moving direction a is ¼.

(3) Distance of one-dimensional movement of image capturing object (hereinafter also simply called moving distance, realistic moving distance, or actual moving distance of image capturing object) is set to horizontal direction distance on an image. Accordingly, as gradient a of moving direction θ approaches 0, the difference between actual moving distance of image capturing object along moving direction and distance of one-dimensional movement of image capturing object is reduced. Accordingly, in the present invention, when plural moving directions suitable for the super-resolution processing exist, it is desirable to select moving direction in which gradient a is close to 0.

(4) Moving direction θ of image capturing object is considered in a coordinate system normalized in aspect ratio of pixel of image capturing element (e.g., CCD element) within image capturing device (e.g., CCD camera). Namely, the coordinate system normalized by the pixel, i.e., sampling interval is also considered in an image except for 1:1 in longitudinal and transversal ratios.

Namely, no picture element (pixel) of CCD image capturing element necessarily has a square shape. For example, as shown in FIG. 1, picture element (pixel) of CCD image capturing element can also have a rectangular shape. When moving direction of image capturing object is 45° with respect to pixel of CCD having rectangular shape, sub-pixel track (definition of sub-pixel track is described by <1>) is different from the case of pixel of CCD having square shape. Accordingly, in the present invention, it is considered in the coordinate system normalized by aspect ratio of pixel of CCD image capturing element. Namely, in the case of FIG. 1, direction of 45° provided when it is considered in units of x-axis and y-axis shown in the coordinate system is set to moving direction of image capturing object.

<1> Basic Characteristic of Sub-Pixel Track

Next, on the premise that track of image capturing object linearly moved can be precisely measured, basic characteristic relating to a sub-pixel component included in this moving track will first be described. In short, when the premise of moving image capturing object at an unlimited length is set to a precondition, the corresponding relation between moving angle (moving direction) of image capturing object and distance between sub-pixel tracks will be considered as follows.

Figure 2:
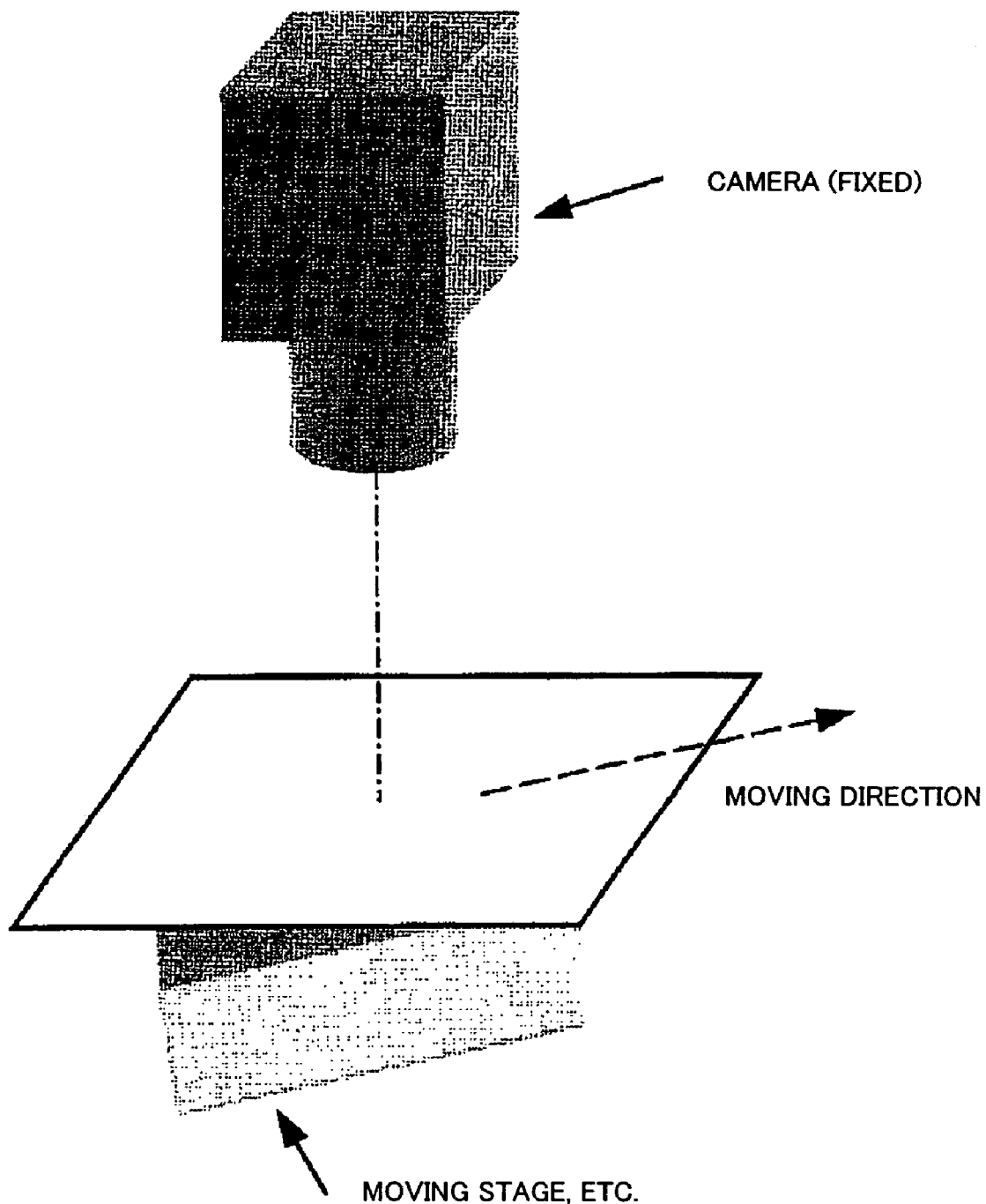
FIG. 2 is a typical view showing image capturing landscape of sub-pixel motion image suitable for the super-resolution processing by a fixed image capturing device in the present invention.

Here, FIG. 2 is a typical view showing image capturing landscape of sub-pixel motion image suitable for the super-resolution processing by a fixed image capturing device (e.g., a CCD camera) in the present invention. As shown in FIG. 2, a moving mechanism (e.g., a moving stage) is constructed so as to be inclined and moved straightly (i.e., one-dimensionally) with respect to the fixed image capturing device (e.g., CCD camera). The image capturing object is fixed to this moving mechanism (here, the moving stage). The moving stage (image capturing object) moved one-dimensionally along a predetermined moving direction is captured by the image capturing device in time series.

Conventionally, in order to capture sub-pixel motion image suitable for the super-resolution processing (i.e., an image having an appropriate two-dimensional displacement between images), a slight displacement is made in vertical direction and horizontal direction by combining two moving stages. In the present invention, when image capturing object is moved in a direction inclined with respect to fixed image capturing device, i.e., when moving stage is moved in inclined direction in the case of FIG. 2, image capturing object is moved in vertical direction and horizontal direction. Accordingly, if only appropriate moving direction (moving angle) and moving distance are determined with respect to image capturing object, it is possible to simply capture sub-pixel motion image (i.e., an image having an appropriate two-dimensional displacement between images) able to perform the super-resolution processing of very high precision.

Figure 3:
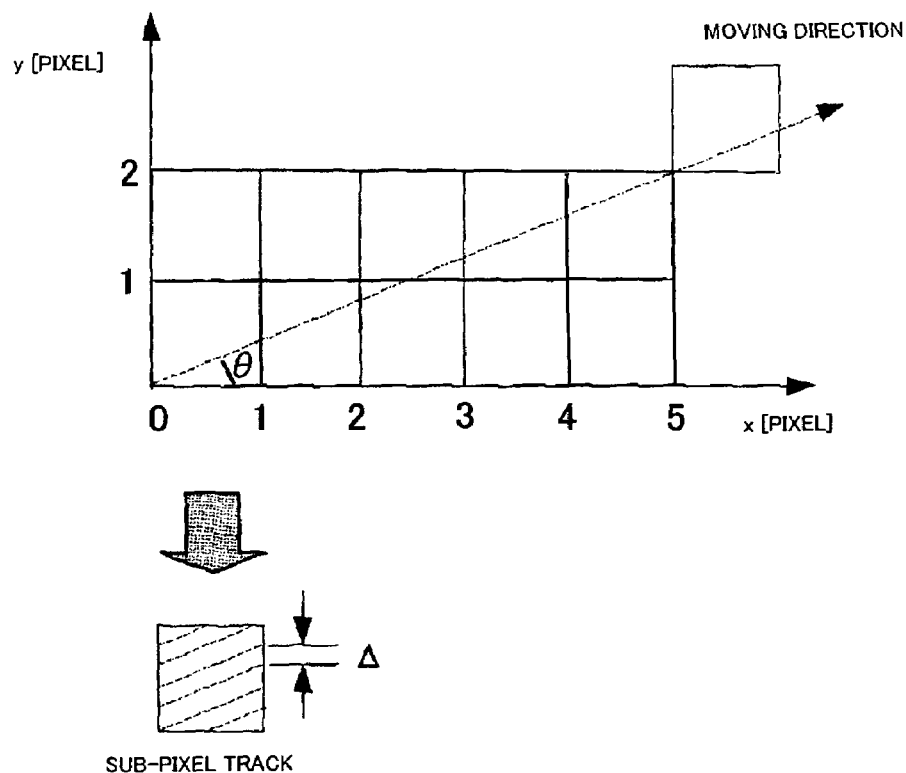
FIG. 3 is a conceptual view showing one-dimensional movement of image capturing object in the present invention.

FIG. 3 is a conceptual view showing one-dimensional movement of image capturing object in the present invention as shown in FIG. 2. In FIG. 3, x-axis is an axis representing horizontal direction with respect to image capturing element (here, CCD element) within fixed image capturing device (here, CCD camera). Y-axis is an axis representing vertical direction with respect to image capturing element (here, CCD element) within fixed image capturing device (here, CCD camera). Both units of x-axis and y-axis are set to pixel, and one pixel here represents one pixel of image capturing element (here, CCD element).

As shown in FIG. 3, when moving direction (moving angle) of image capturing object is set to θ, moving track of image capturing object passes along the direction not represented by pixel unit but represented by sub-pixel unit in accordance with set moving direction θ.

When the super-resolution processing is performed, the movement in pixel unit is the same if corresponding pixel number is shifted. Therefore, only moving amount in sub-pixel unit becomes a problem.

In the present invention, only moving amount in sub-pixel unit is considered. When image capturing object is moved in moving direction θ as shown in FIG. 3 and moving track of sub-pixel of its image capturing object is collected, this moving track is provided as shown in lower portion of FIG. 3. In this connection, as shown in FIG. 3, in the case of moving angle of image capturing object moved rightward by five pixels in x-axis direction and moved upward by two pixels in y-axis direction, sub-pixel track ought to be formed as shown in lower portion of FIG. 3. An object of the present invention is to consider whether an appropriate sub-pixel track is obtained by taking which moving angle.

Here, measuring result of displacement between images at observing time of a sufficiently large moving distance is considered. The track passing a 1×1 [pixel] area constitutes a specific pattern in accordance with moving direction. The track with respect to this 1×1 [pixel] area is called a sub-pixel track in the present invention. One pixel area constructed by four points of (0,0), (1,0), (1,1) and (0,1) in coordinate system is considered as this 1×1 [pixel] area.

Here, if the displacement between images is measured over a sufficiently long moving distance, it can be considered that sub-pixel track becomes an equal interval. In this supposition, it is premised that gradient a of moving direction θ is represented by a rational number. When gradient a of moving direction θ is an irrational number, no sub-pixel track becomes an equal interval even when the measurement is continued over a long distance. However, since measurement precision is finite in actual measurement, sub-pixel track can be actually considered as equal interval in measurement with respect to a sufficiently long distance. At this time, vertical distance between sub-pixel tracks Δ (hereinafter also simply called the distance between sub-pixel tracks) (see FIG. 3) is considered.

Moving track of image capturing object is set to y=ax (a is a real number). Gradient a of moving track at this time is a measured value able to be calculated by the measurement using observed sequential images. While image capturing object is fixed, the same result can be also obtained by moving an image capturing system (image capturing element of image capturing device) in gradient a with respect to horizontal direction of the image.

Gradient a of this real number is approximated by a rational number q/p (here, p and q are respectively integers). Concretely, in consideration of valid digit number of real number a, p and q are replaced as follows.

$$p=10^n$$

$$q \approx a \times 10^n \qquad \text{[Equation 1]}$$

At this time, moving track can be represented as in the following equation 2 by using a greatest common divisor gcd(p,q) of p and q.

$$y = \frac{q}{p}x = \frac{\frac{q}{gcd(p,q)}}{\frac{p}{gcd(p,q)}}x = \frac{Q}{P}x = \frac{1}{P}(Qx) \qquad \text{[Equation 2]}$$

Both P and Q in above equation 2 are integers and cannot be reduced any more. It can be considered that gradient of moving track is 1/P by replacing position x of horizontal direction with (Qx). This gradient 1/P corresponds to that one pixel of vertical direction is divided by integer P (see FIG. 4). Accordingly, the distance between sub-pixel tracks Δ is provided as in the following equation 3.

$$\Delta = \frac{1}{P} = \frac{1}{\frac{p}{gcd(p,q)}} = \frac{gcd(p \cdot q)}{p} \quad \text{[Equation 3]}$$

Figure 4:
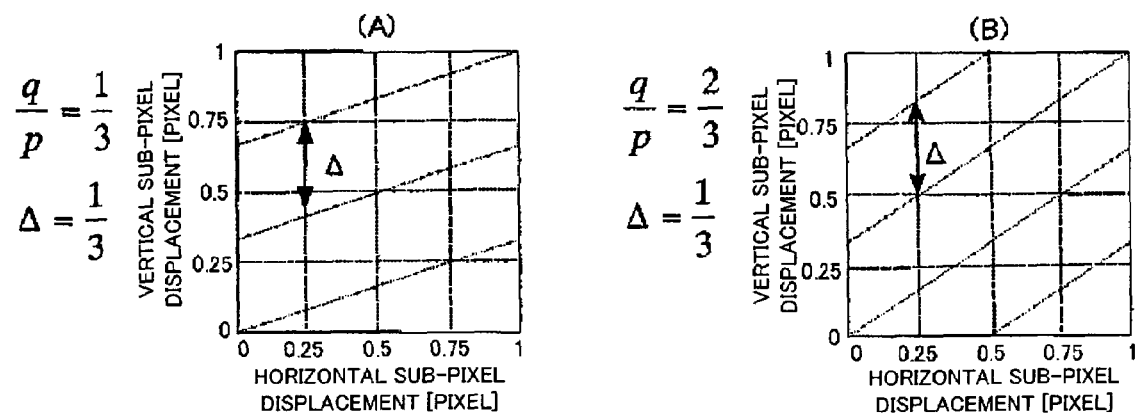
FIG. 4 explains the relation between distance between sub-pixel tracks Δ and q in the present invention.

FIG. 4 explains the relation between the distance between sub-pixel tracks Δ and q. Here, q indicates what portions one pixel of horizontal direction is repeatedly divided into. In the case of FIG. 4(A), the distance between sub-pixel tracks Δ is ⅓, and q is 1. On the other hand, in the case of FIG. 4(B), the distance between sub-pixel tracks Δ is ⅓, and q is 2. As can be seen from FIG. 4(B), one pixel of horizontal direction is divided into two. Accordingly, it is well known that q does not relate to the distance between sub-pixel tracks Δ.

As the distance between sub-pixel tracks Δ is shortened, a fine sub-pixel motion can be captured. Accordingly, a further good result is also obtained with respect to the super-resolution processing using this fine sub-pixel motion.

Figure 5:
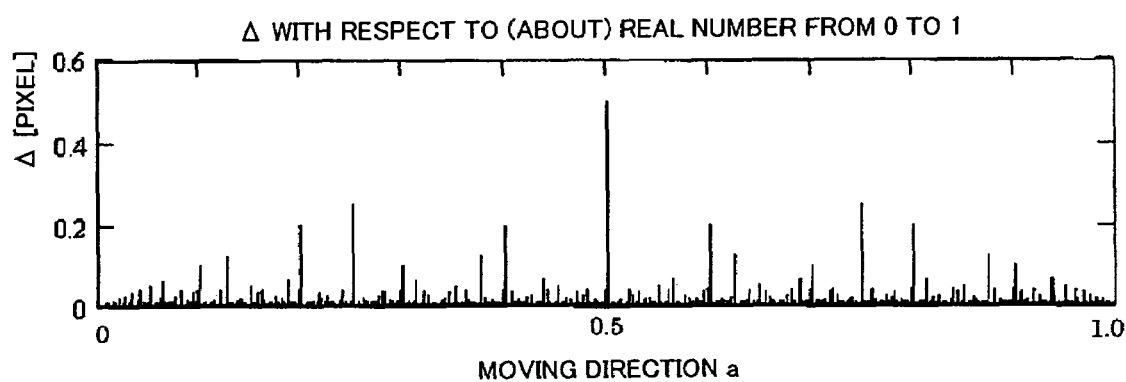
FIG. 5 is a view showing the relation between distance between sub-pixel tracks Δ and moving direction of image capturing object.

FIG. 5 is a view showing the relation between the distance between sub-pixel tracks Δ and moving direction of image capturing object. As can be seen from FIG. 5, when moving direction of image capturing object, i.e., gradient a of moving track is finely examined in a range from 0 to 1, there are many gradients (moving direction of image capturing object) in which the distance between sub-pixel tracks Δ becomes very small.

However, a large moving distance L shown by the following equation 4 is required to realize such a small distance between sub-pixel tracks Δ. For example, in the case of Δ=0.05 [pixel], it is necessary to set moving distance L to 20 pixels.

$$L = P = \frac{p}{gcd(p,q)} = \frac{1}{\Delta} \quad \text{[Equation 4]}$$

Figure 6:
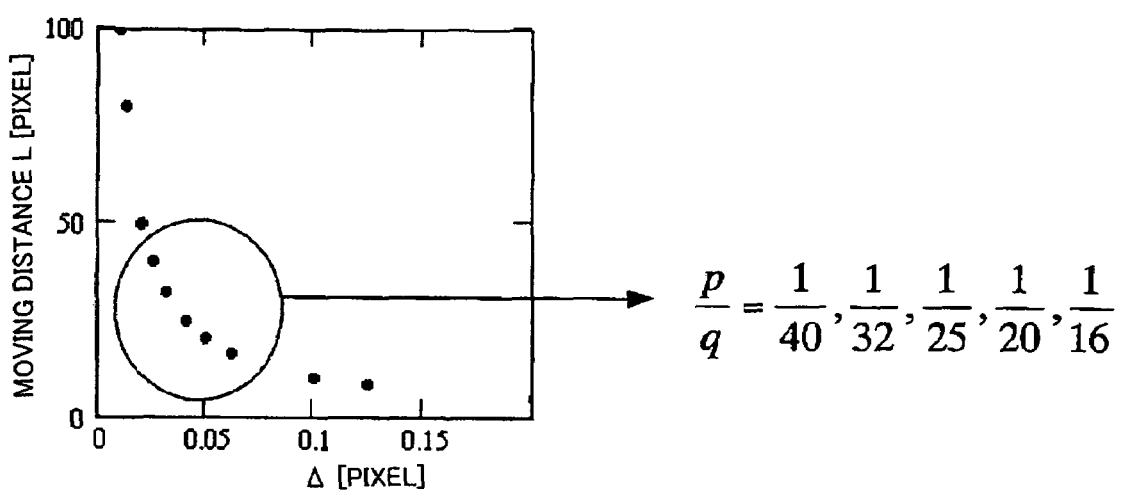
FIG. 6 is a graph showing the relation between distance between sub-pixel tracks Δ and moving distance L.

When the relation between the distance between sub-pixel tracks Δ and moving distance L is shown by a graph, this graph is provided as shown in FIG. 6. As can be seen from FIG. 6, the number of effective moving direction in a range until degree of realistic moving distance L=30 [pixel] is very slight (5 to 6). Namely, gradients of effective moving direction q/p=1/40, 1/32, 1/25, 1/20 and 1/16 are formed.

<2> Evaluation by Using Maximum Value and Minimum Value of the Distance Between Sub-Pixel Tracks Δ

As mentioned above, it is well known that the characteristic of sub-pixel component (i.e., sub-pixel track) included in moving track of image capturing object is basically determined in accordance with moving distance of image capturing object. Thus, it is known that it is also necessary to increase moving distance of image capturing object in accordance with an increase in magnification for performing the super-resolution processing. However, it is realistically not considered as an actual problem to capture a limitlessly long moving track. Accordingly, the characteristic of sub-pixel track will be considered as follows when it is limited to moving distance of image capturing object of length of a certain extent.

In "<1> Basic characteristic of sub-pixel track", it is considered on the premise that one pixel area is "covered" at uniform distance between sub-pixel tracks Δ. However, in reality, it is not necessary to "cover" one pixel area at uniform distance between sub-pixel tracks Δ. Therefore, method for evaluating that passing density of sub-pixel track is close to uniformity will be considered.

Figure 7:
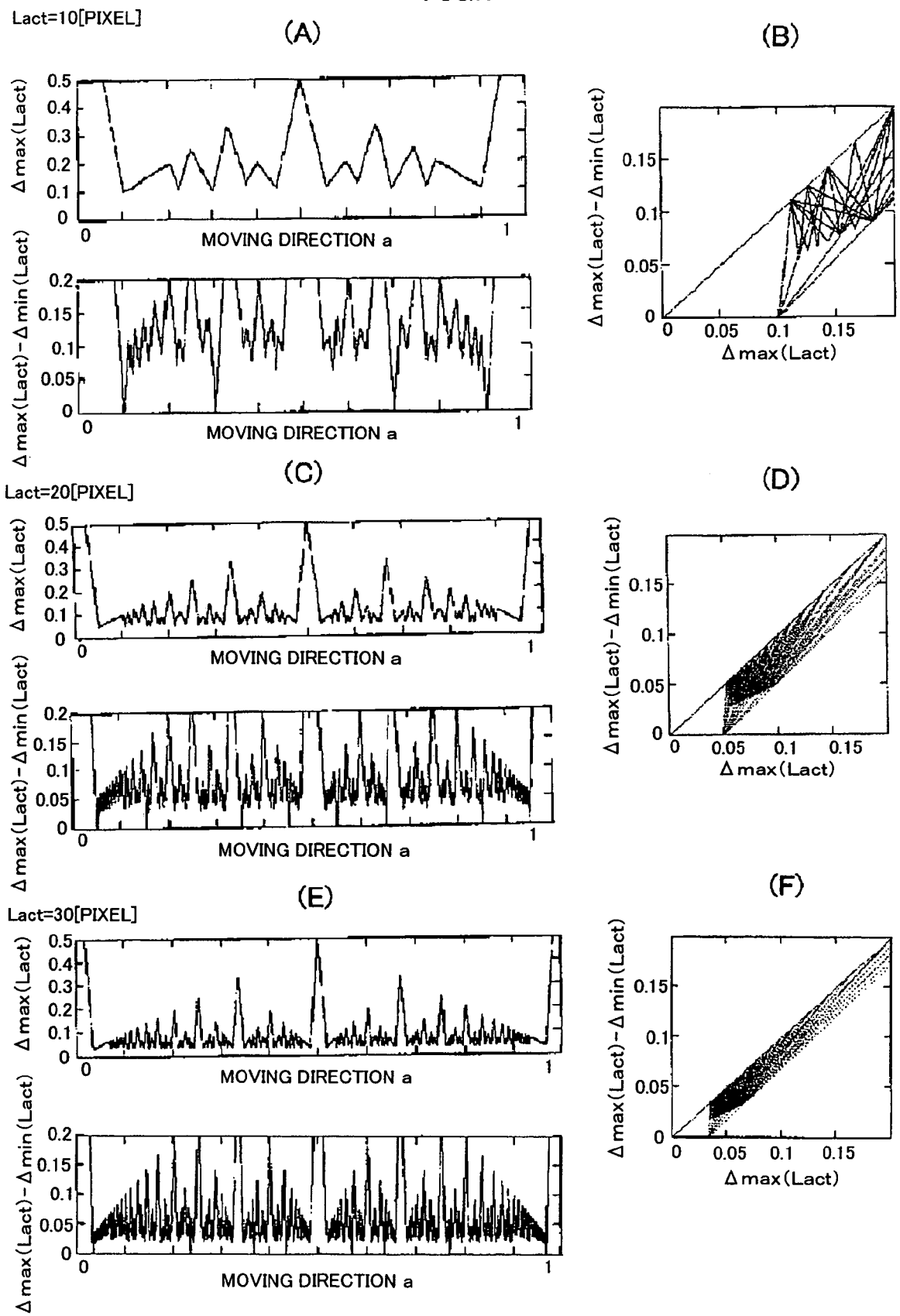
FIG. 7 shows the relation between maximum value Δmax (Lact) of distance between sub-pixel tracks Δ and moving direction, and the relation between the difference between maximum value and minimum value of distance between sub-pixel tracks Δ (Δmax(Lact)−Δmin(Lact)) and moving direction.

As mentioned above, the distance between sub-pixel tracks Δ is clearly changed in accordance with moving direction (gradient of moving direction) q/p, and actual moving distance Lact of observed image capturing object. Here, maximum value Δmax of the distance between sub-pixel tracks Δ and its minimum value Δmin are evaluated as function of moving direction and observed moving distance Lact. In reality, the maximum value Δmax(Lact) of the distance between sub-pixel tracks Δ and the difference between the maximum value and the minimum value (Δmax(Lact)−Δmin(Lact)) are evaluated (see FIG. 7). FIG. 7 shows graphs in which moving distance of image capturing object (Lact) is respectively 10 [pixel], 20 [pixel] and 30 [pixel]

FIGS. 7(A) and 7(B) show graphs in which the moving distance Lact is 10 [pixel]. FIG. 7(A) is a view showing the relation between the maximum value Δmax(Lact) of the distance between sub-pixel tracks Δ and moving direction of image capturing object when image capturing object is actually moved by 10 pixels in horizontal direction. FIG. 7(A) is also a graph showing the relation between the difference between the maximum value and the minimum value of the distance between sub-pixel tracks Δ (Δmax(Lact)−Δmin (Lact)) and moving direction of image capturing object when image capturing object is actually moved by 10 pixels in horizontal direction. FIG. 7(B) is a graph for summarizing two graphs of FIG. 7(A). Similarly, FIGS. 7(C) and 7(D) show graphs when the moving distance Lact is 20 [pixel]. FIGS. 7(E) and 7(F) show graphs when the moving distance Lact is 30 [pixel].

As shown in FIG. 7, as actual moving distance of image capturing object (Lact) is lengthened, the distance between sub-pixel tracks is more uniformly subdivided, and uniform and fine sub-pixel motion can be captured. Namely, as the maximum value Δmax(Lact) of the distance between sub-pixel tracks Δ and the difference between the maximum value and the minimum value of the distance between sub-pixel tracks Δ (Δmax(Lact)−Δmin(Lact)) are close to 0, sub-pixel motion suitable for the super-resolution processing can be captured if moving direction at that time is selected.

When moving distance of image capturing object (Lact) is determined, minimum value of Δmax(Lact) is determined. Namely, no scan finer than the minimum value of the determined Δmax(Lact) can be performed even when moving direction is adjusted in any way. The minimum value of Δmax(Lact) is 1/Lact. For example, as shown in FIG. 7, in the case of FIG. 7(B), the minimum value of Δmax(Lact) is 1/10=0.1. In the case of FIG. 7(D), the minimum value of Δmax(Lact) is 1/20=0.05. In the case of FIG. 7(F), the minimum value of Δmax(Lact) is 1/30.

There are several moving directions which can obtain the minimum value of Δmax(Lact), i.e., moving direction for giving Δmax(Lact) close to the minimum. A moving direction for minimizing Δmax(Lact)−Δmin(Lact) is selected from these moving directions. The minimum value of Δmax (Lact)−Δmin(Lact) is 0.

Therefore, the following equation 5 is considered as normalized evaluation value at which Δmax(Lact) and Δmax (Lact)−Δmin(Lact) are considered.

$$\text{Cover}(Lact) = \frac{\Delta\max(Lact) \times (\Delta\max(Lact) - \Delta\min(Lact))}{\frac{1}{Lact^2}} \quad \text{[Equation 5]}$$

The sub-pixel motion suitable for the super-resolution processing of high precision is obtained by using an evaluation function Cover(Lact) which is represented in above equation 5 and selecting moving direction of Cover(Lact)<1. Namely, moving direction in which evaluation function Cover(Lact) ≧1 is formed is not selected.

Figure 8:
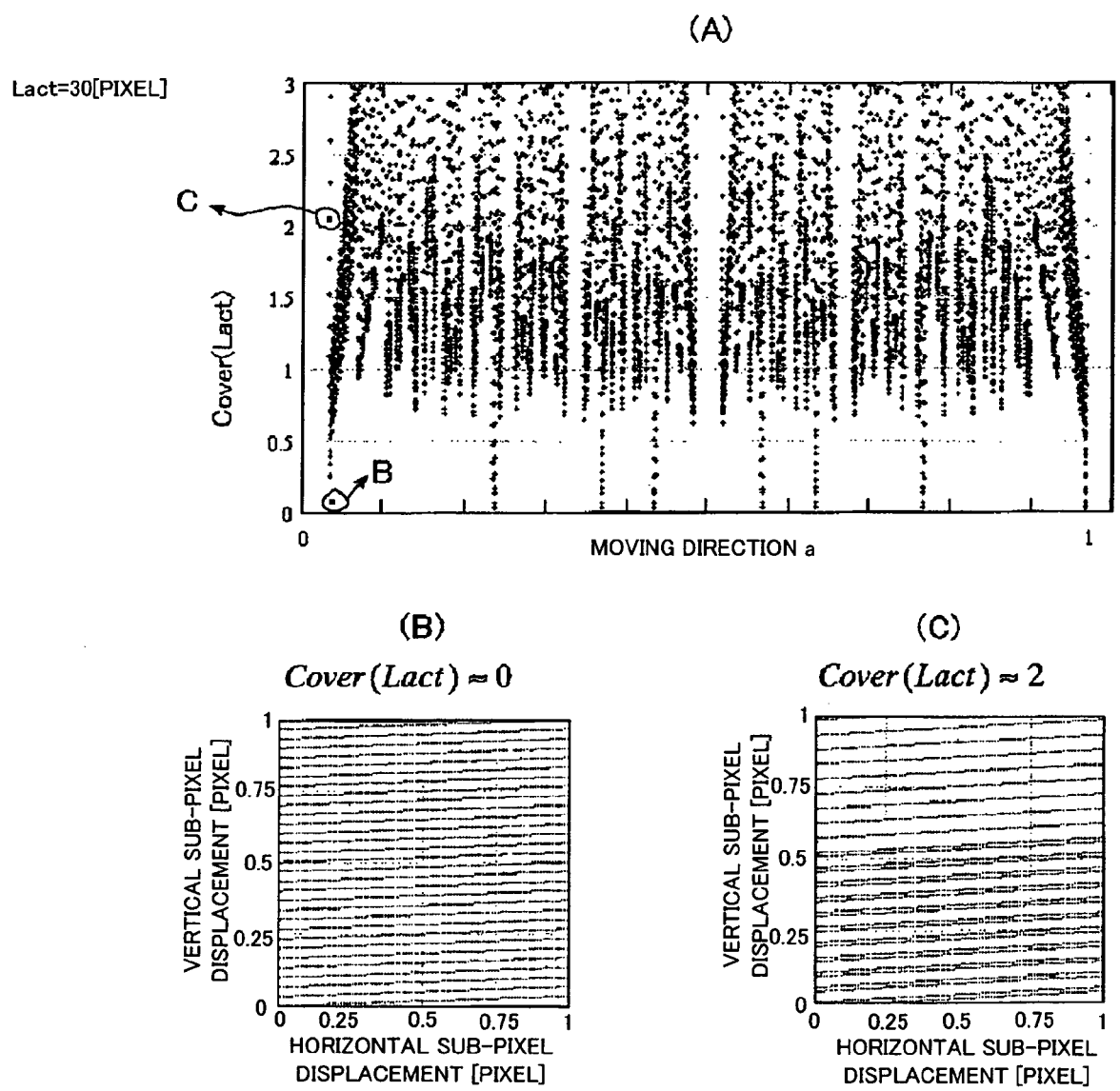
FIG. 8 explains evaluation function Cover(Lact).

FIG. 8(A) is a graph showing the relation between evaluation function Cover(Lact) and moving direction when moving distance Lact is 30 [pixel]. In FIG. 8(A), when the moving directions corresponding to B and C indicated by arrows are selected, sub-pixel motion distributions are respectively shown in FIGS. 8(B) and 8(C). In this connection, in FIGS. 8(B) and 8(C), the moving directions are about the same and only values of evaluation function Cover (Lact) are different. Since Cover (Lact)≈0 of FIG. 8(B) is formed, it is well known that uniform and fine sub-pixel track is entirely obtained. On the other hand, since Cover (Lact)≈2 is formed in the case of FIG. 8(C) even in the same moving direction, it is also well known that uniform and fine sub-pixel track cannot be entirely obtained.

With respect to Δmax(Lact) and Δmin(Lact), no calculation equation can be analytically shown. However, for example, Δmax(Lact) and Δmin(Lact) can be calculated by a simple numerical calculation algorithm as shown in FIG. 9.

<3> Optimum Sub-Pixel Motion with Respect to a Minimum Number of Captured Image Required in the Super-Resolution Processing of Predetermined Magnification Next, a concrete embodiment of the present invention will be explained when the super-resolution processing of predetermined magnification is performed. Here, minimum number of captured image and optimum sub-pixel motion are shown when the super-resolution processing of 4×4 is performed.

In the super-resolution processing of 4×4, it is sufficient to obtain sub-pixel displacement every 0.25 [pixel]. Namely, minimum value of Δmax(Lact)=0.25=¼=1/Lact is formed. Accordingly, since Lact=4 is formed, it is considered to measure movement of displacement of 4 [pixel] in horizontal direction.

Figure 10:
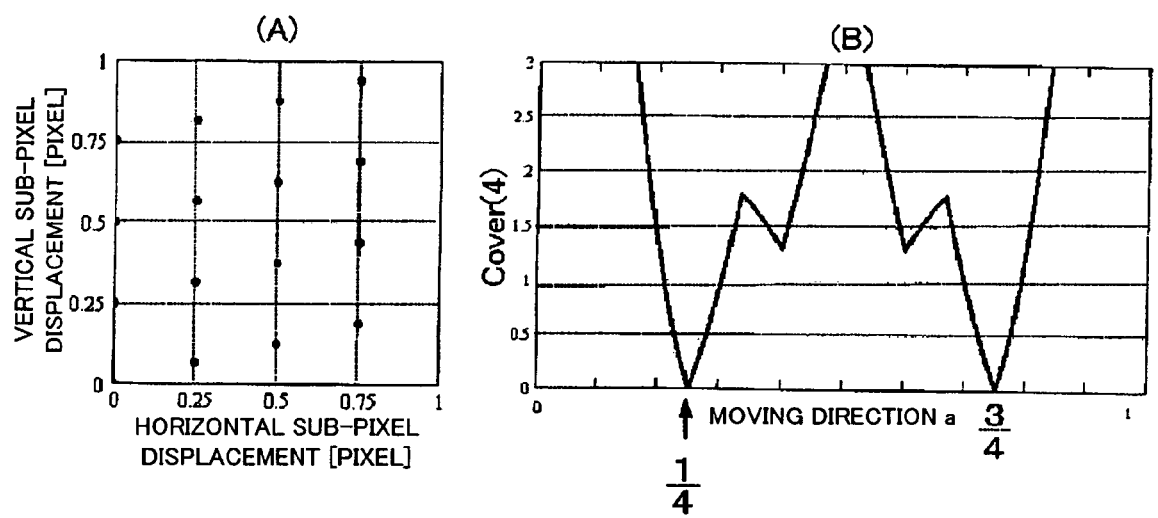
FIG. 10 explains optimum sub-pixel motion with respect to a minimum number of captured image required in the super-resolution processing of predetermined magnification.

FIG. 10(B) is a graph showing the relation between evaluation function Cover(4) and moving direction when moving distance Lact is 4 [pixel]. As can be seen from FIG. 10(B), there are two moving directions for forming Cover(4)=0 (i.e., two moving directions for obtaining sub-pixel motion suitable for the super-resolution processing). That is to say, one moving direction is set to ¼, and another moving direction is set to ¾.

Here, ¼ is selected as moving direction. When moving direction is set to ¼ and moving distance of image capturing object (Lact) is set to 4, sub-pixel motion distribution as shown in FIG. 10(A) is obtained. It is possible to capture the minimum number of captured image (16 in this example) required in the super-resolution processing of 4×4 from the sub-pixel motion distribution as shown in FIG. 10(A).

For example, when image capturing object is moved by 0.25 [pixel] for ¹⁄₃₀ [second] in horizontal direction, necessary time for capturing 16 images required in the super-resolution processing of 4×4 is about 0.5 [second]. If only appropriate moving direction and moving distance of image capturing object are determined by using the present invention, sub-pixel motion images of minimum number required in the super-resolution processing of predetermined magnification can be simply captured for a short time.

<4> Decision Method of Moving Direction in which the Amount of Information Relating to Sub-Pixel Position is Increased as the Number of Captured Image is Increased Conventional super-resolution processing is performed with resolution of predetermined magnification, e.g., a magnification of four times in horizontal direction and a magnification of four times in vertical direction. In the present invention, decision method of moving direction for obtaining sub-pixel motion suitable for the super-resolution processing gradually raised in resolution as in 2×2, 3×3 and 4×4 as capturing of image capturing object which is one-dimensionally moved along a predetermined moving direction is advanced will be considered as follows.

Namely, in the present invention, moving direction for sequentially detailing sub-pixel motion suitable for the super-resolution processing able to sequentially utilize captured images as image capturing is advanced is determined by evaluation function SCover(LM) described later. Namely, moving direction for setting value of evaluation function SCover(LM) to be close to 0 is selected. Images obtained by capturing the image capturing object which is moved along selected moving direction is utilized. Thus, it is also possible to construct super-resolution processing system for setting image to gradually have high precision and high resolution.

When moving direction (i.e., gradient of moving direction) a=q/p=¼ is set, it is optimal to set moving distance of image capturing object (Lact) (i.e., horizontal moving distance of image capturing object) to 4. However, even when moving distance of image capturing object is further increased, moving track of image capturing object merely passes through the same position, and no information amount relating to a different sub-pixel position is increased.

Therefore, evaluation function represented in the following equation 6 with respect to all moving distances in which Lact=4 or more will be considered.

$$SCover(LM) = \frac{\sum_{Lact=4}^{LM} \text{Cover}(Lact)}{\sum_{Lact=4}^{LM} 1} \quad \text{[Equation 6]}$$

Here, LM indicates entire moving distance of image capturing object from the beginning of capturing of image capturing object to its termination. Namely, LM indicates maximum moving distance of image capturing object. Further, realistic application is considered and the following area limit is set to reduce calculating amount with respect to moving direction a in which 0<a<1 is set to a precondition.

Namely, first, since minimum moving distance of image capturing object is Lact=4, it is not necessary to consider an area of a≦¼. Further, it is also not necessary to consider an area of a>0.5, since a>0.5 is a repeat of 0<a<0.5. Accordingly, the range of 0.25<a<0.5 is considered.

Figure 11:
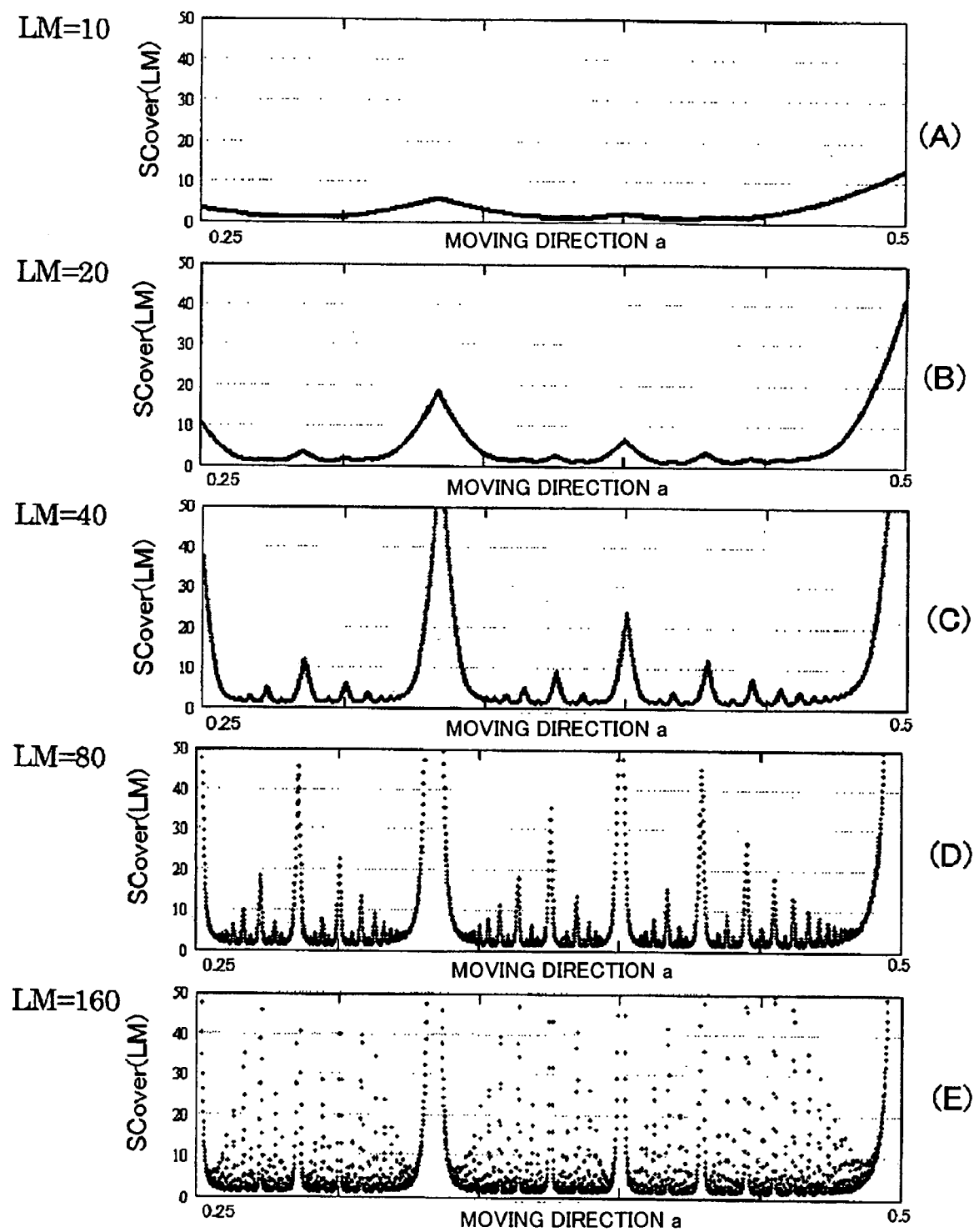
FIG. 11 shows the relation between evaluation function SCover(LM) and moving direction a in the case of different maximum moving distance LM.

FIG. 11 shows the relation between evaluation function SCover(LM) and moving direction a in the case of different maximum moving distance LM. The maximum moving distance LM of FIG. 11(A) is 10 [pixel], and the maximum moving distance LM of FIG. 11(B) is 20 [pixel]. The maximum moving distance LM of FIG. 11(C) is 40 [pixel], and the maximum moving distance LM of FIG. 11(D) is 80 [pixel]. The maximum moving distance LM of FIG. 11(E) is 160 [pixel].

As can be seen from FIG. 11, for example, when maximum moving distance LM is 10 [pixel], no moving direction for sequentially obtaining the sub-pixel motion suitable for the super-resolution processing of higher precision is clear so much. However, for example, when graph in which maximum moving distance LM is 160 [pixel] is seen, moving direction for reducing the value of SCover(LM) becomes clear.

Such a moving direction for reducing the value of Scover (LM) is a good moving direction in which sub-pixel motion suitable for the super-resolution processing of higher precision is sequentially obtained as capturing is advanced. In short, moving direction for reducing the value of Scover(LM) is selected on the premise that maximum moving distance able to move image capturing object is entirely 160 [pixel]. Thus, even when moving distance of image capturing object is an arbitrary distance of 4 [pixel] or more and 160 [pixel] or less, sub-pixel motion suitable for the super-resolution processing is obtained.

In reality, moving direction for setting the value of evaluation function SCover(LM) to be close to 0, e.g., moving directions of 2650/10000, 2764/10000, 2957/10000, 3037/10000, 3866/10000, 4142/10000, 4190/10000, 4393/10000, 4488/10000, etc. exist. Horizontal moving distance of image capturing object is increased and the distance between sub-pixel tracks is also gradually reduced by selecting such moving directions. Accordingly, since information obtained with respect to sub-pixel displacement is also increased, it is possible to capture image able to be utilized in the super-resolution processing of high precision gradually detailed.

Figure 12:
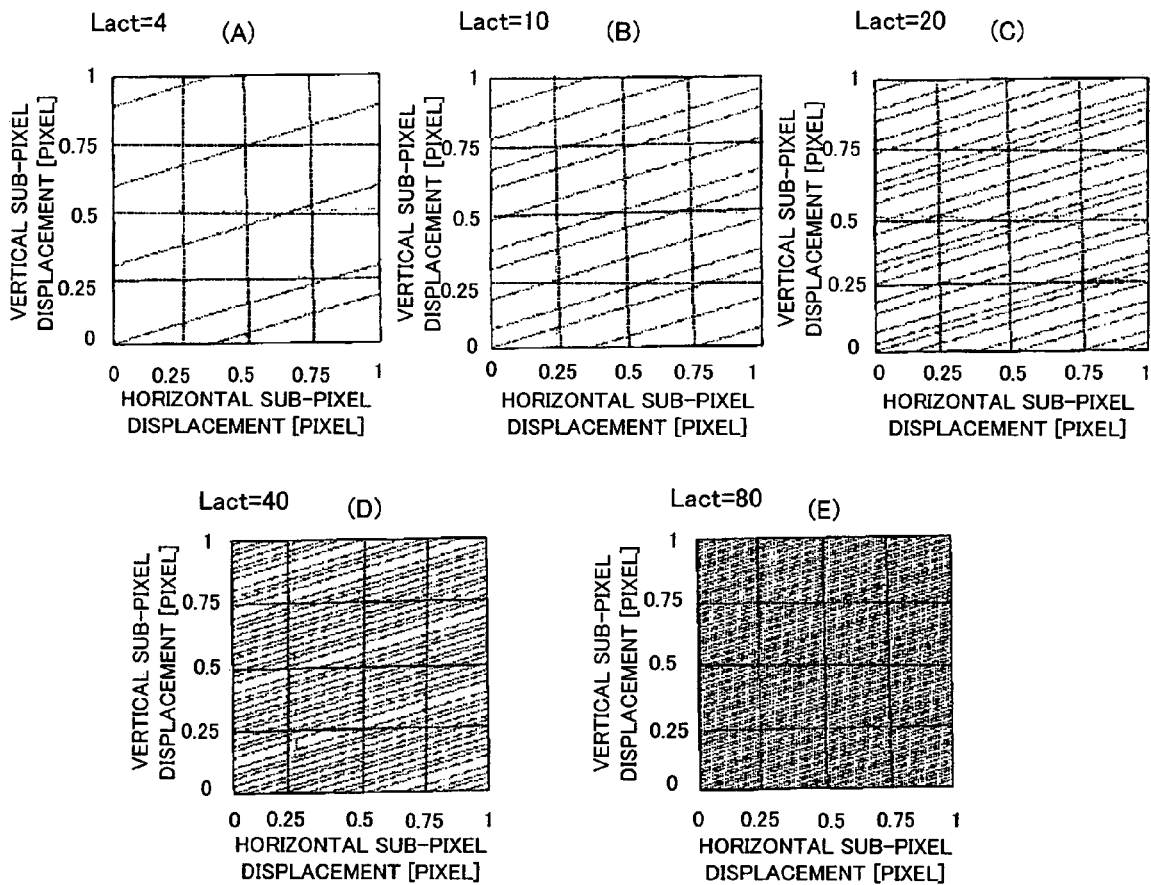
FIG. 12 explains that distance between sub-pixel tracks is gradually reduced as moving distance Lact of image capturing object is increased when moving direction is appropriately set on the basis of evaluation function SCover(LM).

For example, when moving direction a is 2957/10000, as shown in FIG. 12, the distance between sub-pixel tracks is gradually reduced and sub-pixel track is also gradually increased as moving distance of image capturing object (Lact) is increased. Namely, finer sub-pixel motion distribution is entirely uniformly obtained.

<5> Moving Speed of Image Capturing Object

Appropriate moving speed of image capturing object one-dimensionally moved will be considered as follows.

The moving track of image capturing object formed when image is captured at a limitlessly short time interval is premised so far. However, in reality, image is captured at an interval of 1/30 [second] in image capturing device, e.g., a CCD camera. Accordingly, it is necessary to limitlessly reduce moving speed of image capturing object to set the same condition, which is not realistic. In the following description, moving speed of image capturing object according to an object will be considered.

First, in the case of capturing minimum number of captured image required in the super-resolution processing of predetermined magnification within the shortest time, image capturing object is controlled to a constant horizontal moving speed $v_H$ [pixel/sec]. At this time, moving speed of image capturing object along moving direction v [pixel/sec] is provided as shown in the following equation 7.

$$v = v_H \sqrt{1 + \left(\frac{q}{p}\right)^2} \quad \text{[Equation 7]}$$

When frame rate of image capturing device, e.g., frame rate of CCD camera is set to FPS [1/sec], it is sufficient to set distance Δ to the condition as shown in the following equation 8.

$$\Delta = \frac{gcd(p, q)}{p} = \frac{v_H}{FPS} \quad \text{[Equation 8]}$$

Figure 13:
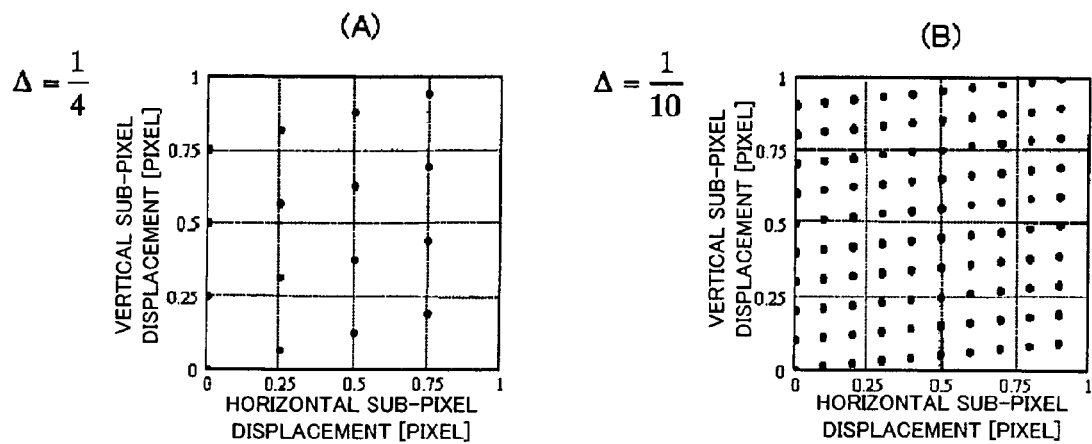
FIG. 13 shows sub-pixel distribution when image capturing object is moved at a constant moving speed.

If image capturing object is moved at moving speed of horizontal direction determined on the basis of the above equation 8, sub-pixel motion as shown in e.g., FIG. 13 can be captured. The sub-pixel motion shown in FIG. 13(A) is suitable for the super-resolution processing of 4×4, and the sub-pixel motion shown in FIG. 13(B) is suitable for the super-resolution processing of 10×10.

When it is next desirous to sequentially obtain precise sub-pixel motion, moving speed of image capturing object is changed in accordance with time, and image capturing object is moved at moving speed gradually slowed. For example, a detailed sub-pixel motion can be captured in accordance with time as shown in FIG. 14 by setting horizontal moving speed of image capturing object at time t ($v_H$ (t) [pixel/sec]) to the following equation 9.

$$v_H(t) = \left(\frac{1}{4}t + \frac{1}{2}at^2\right)FPS \quad \text{[Equation 9]}$$
$$a = -0.0005$$

Figure 14:
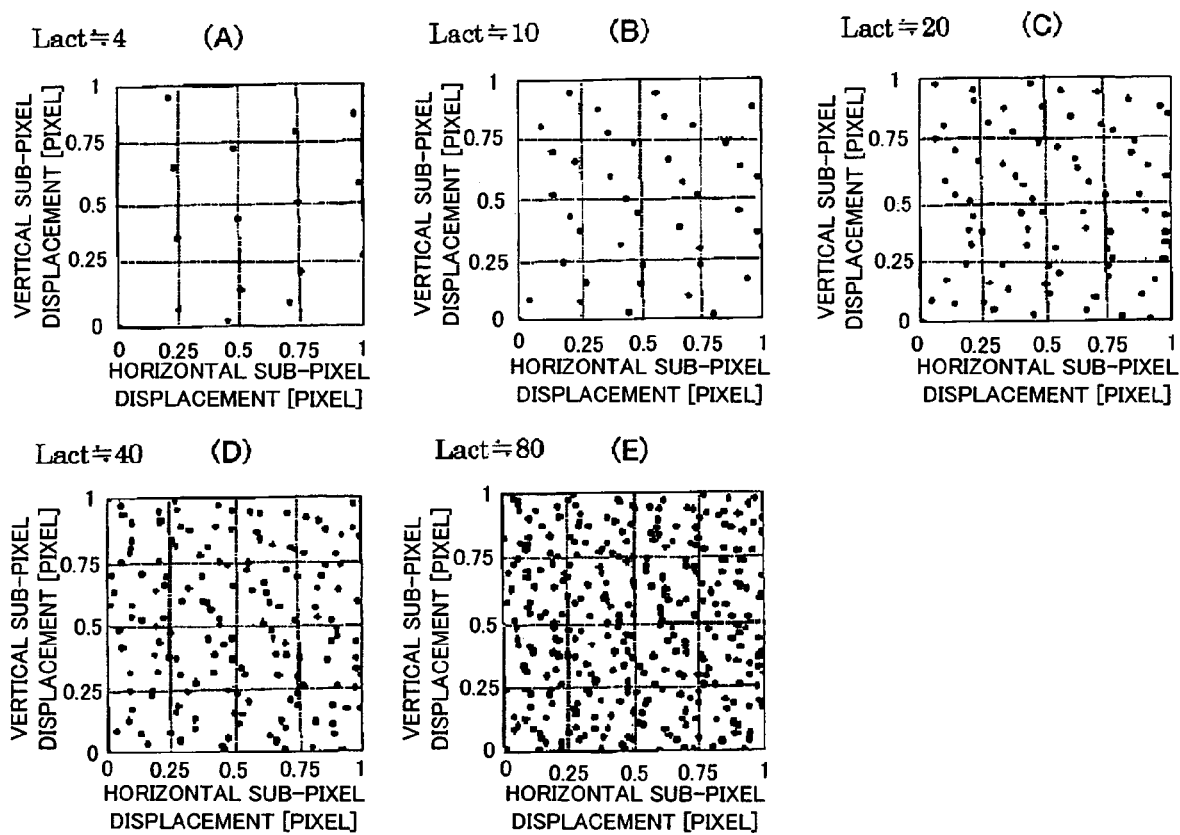
FIG. 14 shows sub-pixel distribution when moving speed of image capturing object is changed in accordance with time and image capturing object is moved at moving speed gradually slowed.

The following equation 10 is used in FIG. 14.

$$\frac{q}{p} = \frac{2957}{10000} \quad \text{[Equation 10]}$$

<6> Experimental Results of Super-Resolution Processing

Here, sequential images of image capturing object which is one-dimensionally moved in a predetermined moving direction were captured by using a fixed single chip type CCD color camera, and super-resolution processing experiment of 4×4 was implemented by using captured Bayer image data. The image capturing object used in the super-resolution processing experiment is a magazine article stuck to a flat screw feed type precise moving base. The screw feed type precise moving base was manually moved.

A direct super-resolution processing technique based on Bayer image data disclosed in patent literature 1 was utilized in the super-resolution processing. Further, "A multiparameter high precision concurrent estimation method in image subpixel matching" disclosed in patent literature 2 was utilized in movement and measurement of image capturing object. One high resolution image is synthesized as a result obtained by performing the super-resolution processing by utilizing 64 low resolution images captured by single chip type CCD color camera.

In the first super-resolution processing experiment, the super-resolution processing is performed by utilizing sequential images (64 images in total) captured by setting an appropriate moving direction of image capturing object which is determined by the present invention. Its details are shown in FIG. 15.

FIG. 15(A) shows image capturing object stuck to the screw feed type precise moving base. The sub-pixel motion image is captured by a fixed single chip type CCD color camera while image capturing object (i.e., a portion surrounded by a rectangular shape within FIG. 15(A)) is moved by a predetermined moving distance (Lact=107.3 [pixel]) in moving direction (a=14.2/107.3) shown by an arrow within FIG. 15(A). FIG. 15(B) shows a sub-pixel motion distribution obtained by measuring sub-pixel motion image captured by image capturing device for capturing an image at an interval of 1/30 [second]. On the other hand, the sub-pixel motion distribution can be calculated from moving direction of image capturing object (a=14.2/107.3) decided by the present invention. The calculated sub-pixel motion distribution is shown in FIG. 15(C).

The super-resolution processing is performed by using 64 low resolution images (see FIG. 15(E)) obtained by capturing image capturing object surrounded by rectangular shape of FIG. 15(D) by using single chip type CCD color camera. Thus, one high resolution image is obtained as shown in FIG. 15(F). As can be seen from FIG. 15(F), when an appropriate moving direction is decided by the present invention, the result of the super-resolution processing is very excellent.

Figure 16:
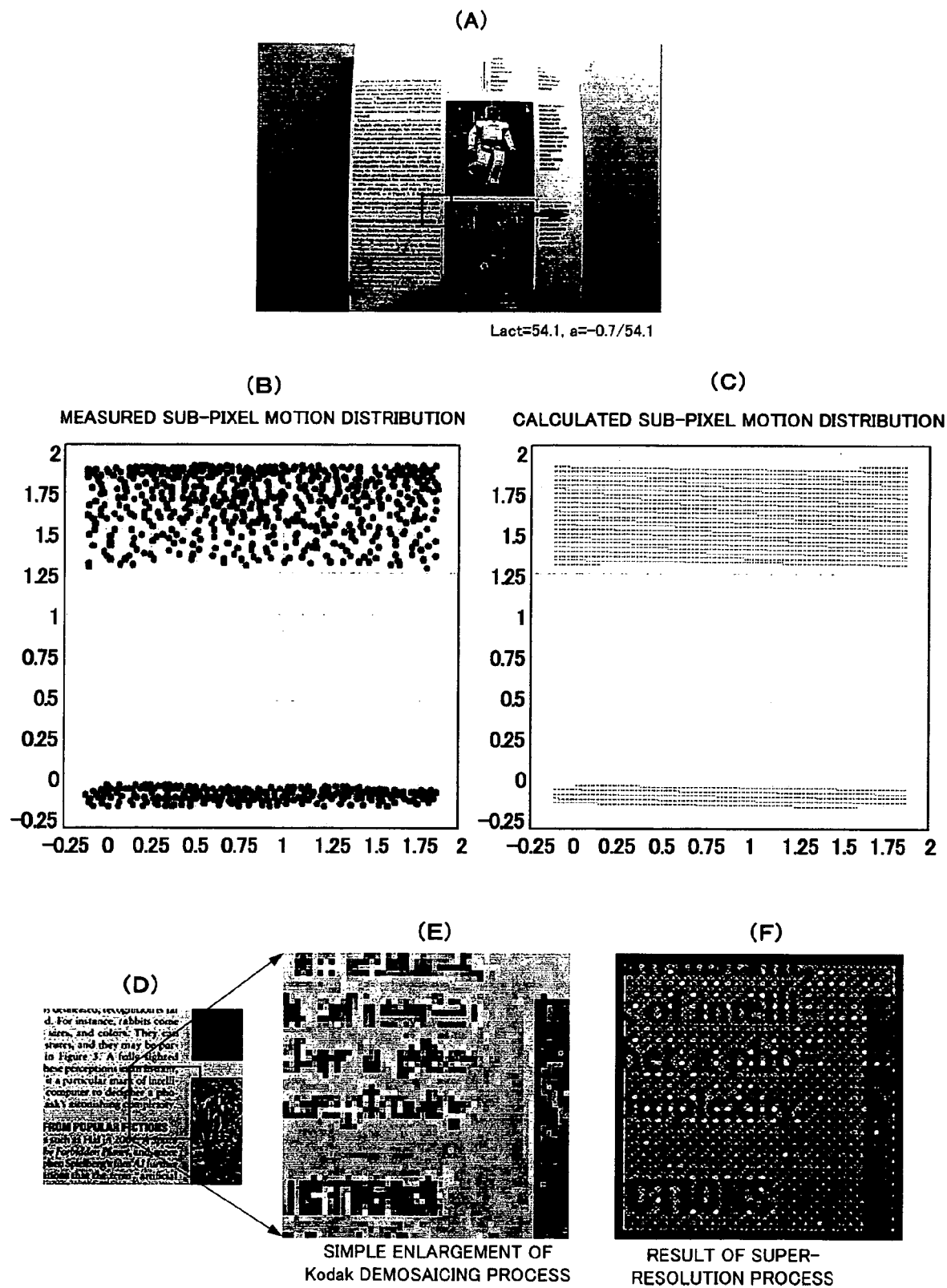
FIG. 16 shows experimental result of the super-resolution processing when moving direction is inappropriately set.

In the second super-resolution processing experiment, when moving direction of image capturing object is inappropriately set and moving distance of image capturing object (Lact) is insufficient, the super-resolution processing is performed by utilizing captured sequential images (64 images in total). Its details are shown in FIG. 16.

FIG. 16(A) shows image capturing object stuck to the screw feed type precise moving base. The sub-pixel motion image is captured by a fixed single chip type CCD color camera while image capturing object (i.e., a portion surrounded by a rectangular shape within FIG. 16(A)) is moved by a predetermined moving distance (Lact=54.1 [pixel]) in moving direction (a=−0.7/54.1) shown by an arrow within FIG. 16(A). FIG. 16(B) shows a sub-pixel motion distribution obtained by measuring sub-pixel motion image captured by image capturing device for capturing an image at an interval of 1/30 [second] On the other hand, the sub-pixel motion distribution can be calculated from moving direction of image capturing object (a=−0.7/54.1). The calculated sub-pixel motion distribution is shown in FIG. 16(C). It is well known from FIGS. 16(B) and 16(C) that no sub-pixel motion is uniformly filled in areas.

The super-resolution processing is performed by using 64 low resolution images (see FIG. 16(E)) obtained by capturing image capturing object surrounded by rectangular shape of FIG. 16(D) by using single chip type CCD color camera. Thus, the super-resolution processing result as shown in FIG. 16(F) is obtained. As can be seen from FIG. 16(F), when moving direction of image capturing object is inappropriately set and moving distance of image capturing object (Lact) is insufficient, it is well known that no appropriate sub-pixel motion distribution can be obtained in the super-resolution processing and resultant image of the super-resolution processing is unsuccessful.

<7> Other Constructional Examples

As mentioned above, the present invention is disclosed in entire construction for capturing image capturing object while image capturing device is fixed as it is and image capturing object is moved in a predetermined moving direction. However, the present invention is not limited to such a construction, but can be implemented by another construction described later (i.e., a construction for fixing image capturing object as it is).

In the present invention, decision method of one-dimensional moving direction for capturing the sub-pixel motion image suitable for the super-resolution processing is preferably implemented by software using a computer system.

<7-1> One Dimensional Movement of Image Capturing Element Within Image Capturing Device In an image capturing system constructed by image capturing device and image capturing object, the method for directly moving image capturing object in predetermined moving direction while fixing image capturing device as it is as mentioned above is considered to one-dimensionally move the image capturing object in the predetermined moving direction. In addition to this, a method for moving image capturing element (e.g., CCD image capturing element) within image capturing device (e.g., CCD camera) in the predetermined moving direction while fixing image capturing object is also considered.

When two-dimensional drive is performed as in image capturing device of conventional system of the above (a), two actuators are required. However, in the method according to the present invention, it is sufficient to perform the one-dimensional drive. Accordingly, moving mechanism of image capturing element can be constructed by one actuator. Therefore, image capturing device able to simply capture sub-pixel motion image suitable for the super-resolution processing can be manufactured at low cost.

Figure 17:
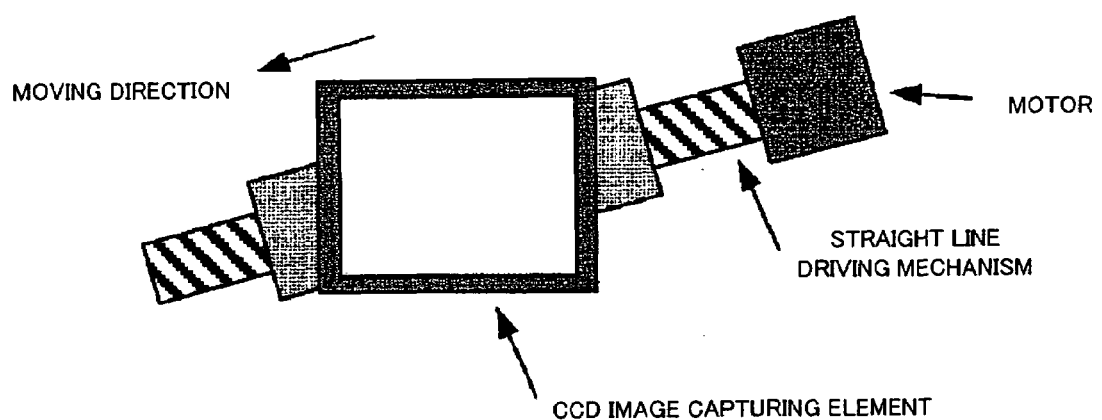
FIG. 17 shows a constructional example for realizing one-dimensional movement of image capturing element within image capturing device.
Figure 18:
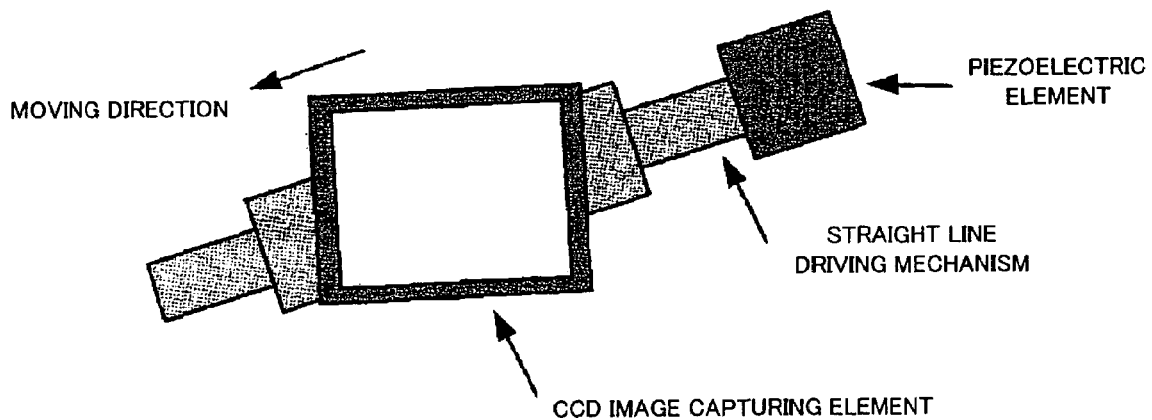
FIG. 18 shows another constructional example for realizing one-dimensional movement of image capturing element within image capturing device.

As actuator for one-dimensionally driving image capturing element (e.g., CCD image capturing element) within image capturing device (e.g., CCD camera), for example, there are a method for driving screw feed mechanism by rotating motor (see FIG. 17), a method for utilizing an element able to realize very small displacement such as a piezoelectric element (see FIG. 18), etc.

<7-2> Change of Image Capturing Direction of Image Capturing Device

In image capturing system constructed by image capturing device and image capturing object, it is possible to realize that image capturing object is one-dimensionally moved in a predetermined moving direction by changing image capturing direction of image capturing device while image capturing object is fixed.

Figure 19:
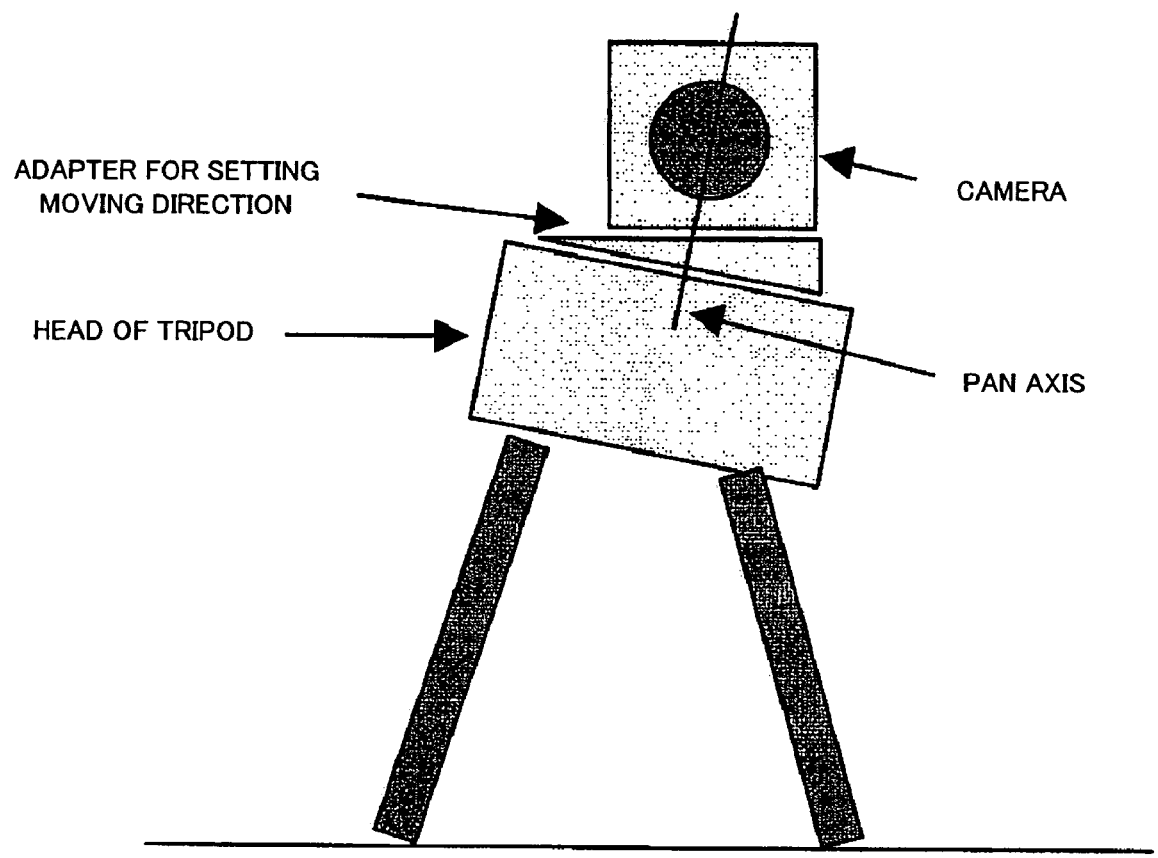
FIG. 19 shows a constructional example for realizing change of image capturing direction of image capturing device.

For example, as shown in FIG. 19, existing image capturing device (camera) and existing tripod are utilized, and an adapter (i.e., a moving direction setting adapter within FIG. 19) for setting horizontal direction rotating axis of camera (pan axis) to a constant angle (this angle is equal to predetermined moving direction of image capturing object, i.e., a moving angle) is arranged between camera and head of tripod. Thus, it is possible to realize that image capturing object is one-dimensionally moved in the predetermined moving direction.

In this moving direction setting adapter, an adapter able to automatically move image capturing direction of camera by mounting driving mechanism, and an adapter for manually changing moving direction of camera without mounting driving mechanism are considered.

<7-3> One-Dimensional Movement of Moving Stage

Figure 20:
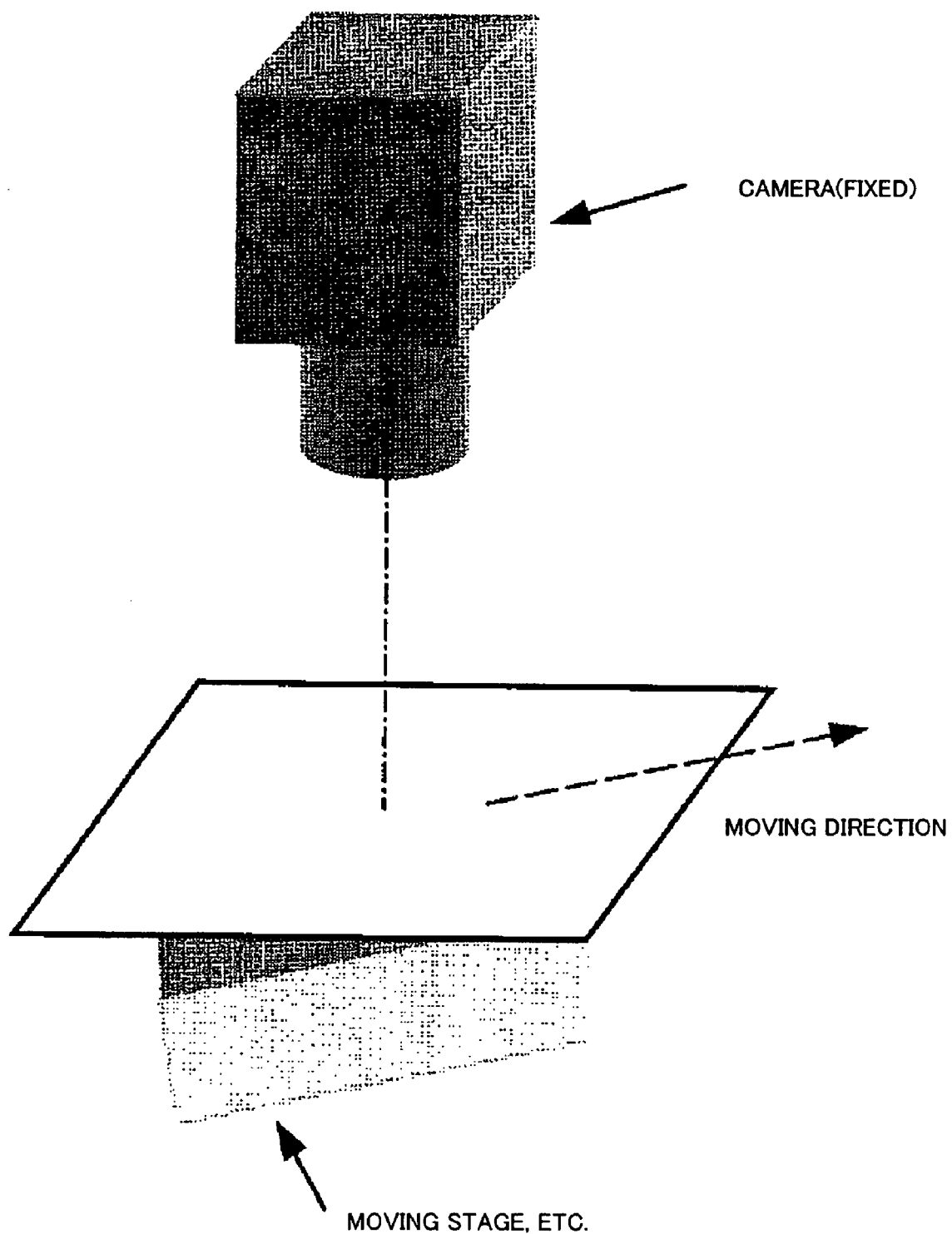
FIG. 20 shows a constructional example for realizing one-dimensional movement of moving stage.

In Microscope Image Capturing and Macro (Enlargement) image capturing, for example, as shown in FIG. 20, it is possible to realize one-dimensional movement of image capturing object in predetermined moving direction by fixing image capturing device (e.g., camera) to tripod, and providing a mechanism able to one-dimensionally move a moving stage in which image capturing object is set.

<7-4> Movement of Image by Using Optical System Within Image Capturing Device

Further, in image capturing system constructed by image capturing device and image capturing object, it is possible to realize that image capturing object is one-dimensionally moved in the predetermined moving direction by movement of image by using optical system within image capturing device while image capturing object is fixed.

Figure 21:
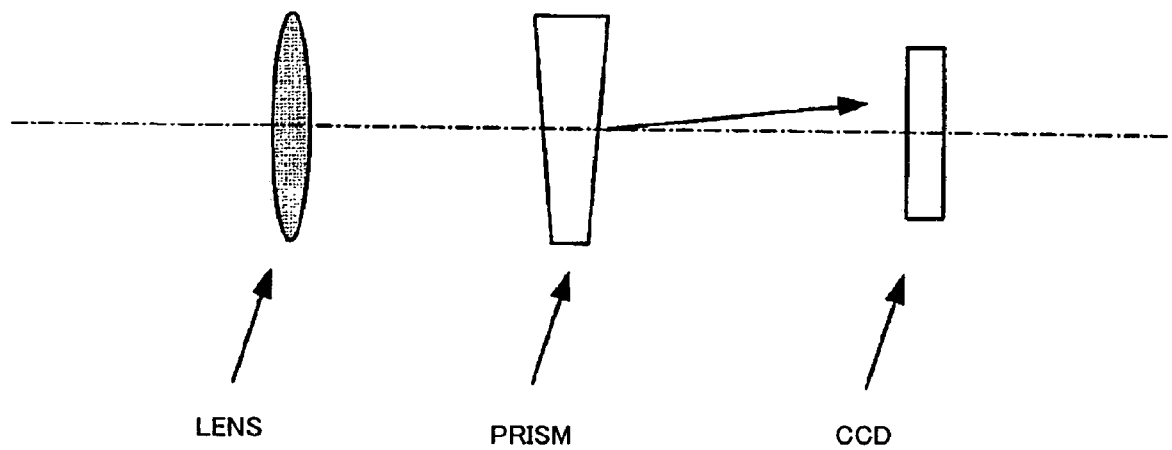
FIG. 21 shows a constructional example for realizing movement of an image by using an optical system within image capturing device.

For example, as shown in FIG. 21, a member for optically moving image is built between lens and image capturing element (e.g., CCD image capturing element) within image capturing device (e.g., CCD camera). The image can be moved in a predetermined moving direction by controlling this member. For example, a prism able to control a refracting direction so as to control vertical angle of the prism, a shift lens, etc. can be utilized as such a member.

INDUSTRIAL APPLICABILITY

As mentioned above, by using movement decision method for capturing sub-pixel motion image suitable for the super-resolution processing and image capturing device using this movement decision method according to the present invention, an excellent effect able to simply capture two-dimensional sub-pixel motion image suitable for the super-resolution processing for a short time by one-dimensional movement of image capturing object or image capturing element can obtain.

By using image capturing device according to the present invention, an image having a displacement required in the super-resolution processing can be reliably captured by one-dimensionally moving image capturing element in the predetermined moving direction. The two-dimensional sub-pixel motion image suitable for the super-resolution processing captured by conventional expensive image capturing device having moving mechanism for two-dimensionally moving image capturing element with high precision can be also simply captured by cheap image capturing device having one-dimensional moving mechanism according to the present invention.

Further, if image capturing object or image capturing element is moved along moving direction determined on the basis of evaluation function Cover(Lact) of the present invention, an optimum two-dimensional sub-pixel motion image with respect to minimum number of captured image required in the super-resolution processing of predetermined magnification can be captured within a short time.

Further, if image capturing object or image capturing element is moved along moving direction determined on the basis of evaluation function SCover(LM) of the present invention, the two-dimensional sub-pixel motion image for performing the super-resolution processing of higher precision can be simply captured as the number of captured image is increased.

LIST OF REFERENCE LITERATURES

Patent Literature 1:
Pamphlet of international publication No. 2004/068862
Patent Literature 2:
Pamphlet of international publication No. 2004/063991

What is claimed is:

1. A movement decision method for capturing sub-pixel motion image suitable for super-resolution processing wherein:
   while an image capturing object is moved along a predetermined one-dimensional moving direction, a sequential image of said image capturing object is captured by a fixed image capturing device,
   said sequential image is set to a two-dimensional sub-pixel motion image suitable for super-resolution processing,
   and said one-dimensional moving direction of said image capturing object in a coordinate system normalized by aspect ratio of pixel of an image capturing element within said image capturing device is determined to p/q of a rational number,
   wherein:
   one pixel of vertical direction of said coordinate system is divided by an integer p, and one pixel of horizontal direction of said coordinate system is divided by an integer q, and
   wherein absolute value of said integer p and absolute value of said integer q are integers which are greater than or equal to 2650.

2. A movement decision method for capturing sub-pixel motion image suitable for super-resolution processing, wherein:
   while an image capturing object is moved along a predetermined one-dimensional moving direction, a sequential image of said image capturing object is captured by a fixed image capturing device,
   said sequential image is set to a two-dimensional sub-pixel motion image suitable for super-resolution processing,
   and said one-dimensional moving direction of said image capturing object in a coordinate system normalized by aspect ratio of pixel of an image capturing element within said image capturing device is determined to p/q of a rational number,
   wherein:
   one pixel of vertical direction of said coordinate system is divided by an integer p, and one pixel of horizontal direction of said coordinate system is divided by an integer q, and
   wherein a moving direction for setting value of an evaluation function Cover(Lact) to be smaller than 1 is set to said one-dimensional moving direction of said image capturing object when magnification of said super-resolution processing is fixed and known.

3. A movement decision method for capturing sub-pixel motion image suitable for super-resolution processing according wherein:
   while an image capturing object is moved along a predetermined one-dimensional moving direction, a sequential image of said image capturing object is captured by a fixed image capturing device,
   said sequential image is set to a two-dimensional sub-pixel motion image suitable for super-resolution processing,
   and said one-dimensional moving direction of said image capturing object in a coordinate system normalized by aspect ratio of pixel of an image capturing element within said image capturing device is determined to p/q of a rational number,
   wherein:
   one pixel of vertical direction of said coordinate system is divided by an integer p, and one pixel of horizontal direction of said coordinate system is divided by an integer q, and
   wherein a moving direction for setting value of an evaluation function SCover(LM) to be smaller than 1 is set to said one-dimensional moving direction of said image capturing object.

4. An image capturing device which captures a two-dimensional sub-pixel motion image suitable for super-resolution processing,
   said image capturing device comprises:
   a driving mechanism which one-dimensionally drives an image capturing element within said image capturing device along an image capturing element moving direction, wherein:
said image capturing element moving direction in a coordinate system normalized by aspect ratio of pixel of said image capturing element is determined to p/q of a rational number,
one pixel of vertical direction of said coordinate system is divided by an integer p, and one pixel of horizontal direction of said coordinate system is divided by an integer q,
absolute value of said integer p and absolute value of said integer q are integers equal to or greater than 2650,
wherein:
a sequential image of a fixed image capturing object is captured while said image capturing element is moved by said driving mechanism along said image capturing element moving direction,
and said sequential image is set to said two-dimensional sub-pixel motion image.

5. An image capturing device which captures a two-dimensional sub-pixel motion image suitable for super-resolution processing,
said image capturing device comprises:
a driving mechanism which one-dimensionally drives an image capturing element within said image capturing device along an image capturing element moving direction,
wherein:
said image capturing element moving direction in a coordinate system normalized by aspect ratio of pixel of said image capturing element is determined to p/q of a rational number,
one pixel of vertical direction of said coordinate system is divided by an integer p, and one pixel of horizontal direction of said coordinate system is divided by an integer q,
a moving direction for setting value of an evaluation function Cover(Lact) to be smaller than 1 is set to said image capturing element moving direction when magnification of said super-resolution processing is fixed and known,
wherein:
a sequential image of a fixed image capturing object is captured while said image capturing element is moved by said driving mechanism along said image capturing element moving direction,
and said sequential image is set to said two-dimensional sub-pixel motion image.

6. An image capturing device which captures a two-dimensional sub-pixel motion image suitable for super-resolution processing,
said image capturing device comprises:
a driving mechanism which one-dimensionally drives an image capturing element within said image capturing device along an image capturing element moving direction,
wherein:
said image capturing element moving direction in a coordinate system normalized by aspect ratio of pixel of said image capturing element is determined to p/q of a rational number,
one pixel of vertical direction of said coordinate system is divided by an integer p, and one pixel of horizontal direction of said coordinate system is divided by an integer q,
a moving direction for setting value of an evaluation function SCover(LM) to be smaller than 1 is set to said image capturing element moving direction,
wherein:
a sequential image of a fixed image capturing object is captured while said image capturing element is moved by said driving mechanism along said image capturing element moving direction,
and said sequential image is set to said two-dimensional sub-pixel motion image.

7. An image capturing device which captures a two-dimensional sub-pixel motion image suitable for super-resolution processing,
said image capturing device arranging a member for optically moving image in a predetermined direction between a lens and an image capturing element,
wherein:
said predetermined direction in a coordinate system normalized by aspect ratio of pixel of said image capturing element is determined to p/q of a rational number,
one pixel of vertical direction of said coordinate system is divided by an integer p, and one pixel of horizontal direction of said coordinate system is divided by an integer q,
absolute value of said integer p and absolute value of said integer q are integers equal to or greater than 2650,
wherein:
a sequential image of a fixed image capturing object is captured while the image is moved optically by said member along said predetermined direction,
and said sequential image is set to said two-dimensional sub-pixel motion image.

8. An image capturing device which captures a two-dimensional sub-pixel motion image suitable for super-resolution processing,
said image capturing device arranging a member for optically moving image in a predetermined direction between a lens and an image capturing element,
wherein:
said predetermined direction in a coordinate system normalized by aspect ratio of pixel of said image capturing element is determined to p/q of a rational number,
one pixel of vertical direction of said coordinate system is divided by an integer p, and one pixel of horizontal direction of said coordinate system is divided by an integer q,
a moving direction for setting value of an evaluation function Cover(Lact) to be smaller than 1 is set to said predetermined direction when magnification of said super-resolution processing is fixed and known,
wherein:
a sequential image of a fixed image capturing object is captured while the image is moved optically by said member along said predetermined direction,
and said sequential image is set to said two-dimensional sub-pixel motion image.

9. An image capturing device which captures a two-dimensional sub-pixel motion image suitable for super-resolution processing,
said image capturing device arranging a member for optically moving image in a predetermined direction between a lens and an image capturing element,
wherein:
said predetermined direction in a coordinate system normalized by aspect ratio of pixel of said image capturing element is determined to p/q of a rational number, one pixel of vertical direction of said coordinate system is divided by an integer p, and one pixel of horizontal direction of said coordinate system is divided by an integer q, a moving direction for setting value of an evaluation function SCover(LM) to be smaller than 1 is set to said predetermined direction, wherein:

a sequential image of a fixed image capturing object is captured while the image is moved optically by said member along said predetermined direction, and said sequential image is set to said two-dimensional sub-pixel motion image.

\* \* \* \* \*